United States Patent [19]
Shuler

[11] 3,740,934
[45] June 26, 1973

[54] AIR FILTERING UNIT INCLUDING A CLAMPING ASSEMBLY

[75] Inventor: Bernard R. Shuler, Louisville, Ky.

[73] Assignee: American Air Filter Company, Inc., Louisville, Ky.

[22] Filed: July 30, 1971

[21] Appl. No.: 167,649

[52] U.S. Cl............... 55/490, 55/502, 55/504, 98/40 D
[51] Int. Cl............................................ B01d 31/00
[58] Field of Search................... 55/483, 484, 490, 55/482, 502, 504; 98/40 D

[56] References Cited
UNITED STATES PATENTS

| | | | |
|---|---|---|---|
| 3,190,208 | 6/1965 | Styne et al. | 98/40 D |
| 3,350,862 | 11/1967 | Nutting | 55/484 |
| 3,360,910 | 1/1968 | Soltis | 55/484 |
| 3,380,219 | 4/1968 | Madl | 98/40 D |
| 3,525,200 | 8/1970 | Smith | 55/484 |
| 3,552,104 | 1/1971 | Wood | 55/502 |

Primary Examiner—Bernard Nozick
Attorney—Charles G. Lamb et al.

[57] ABSTRACT

An air filtering unit including a first flow-through support member, a flow-through filter assembly, a sealing gasket disposed between the support member and the filter assembly, a second flow-through support member for a protective grid in spaced alignment with said filter assembly, and a clamping assembly for holding the filter assembly in fluid tight communication with the first support members, the clamping assembly further communicating with the second support member for the protective grid for maintaining the protective grid in a preselected spaced alignment with the filter assembly.

9 Claims, 3 Drawing Figures

PATENTED JUN 26 1973
3,740,934
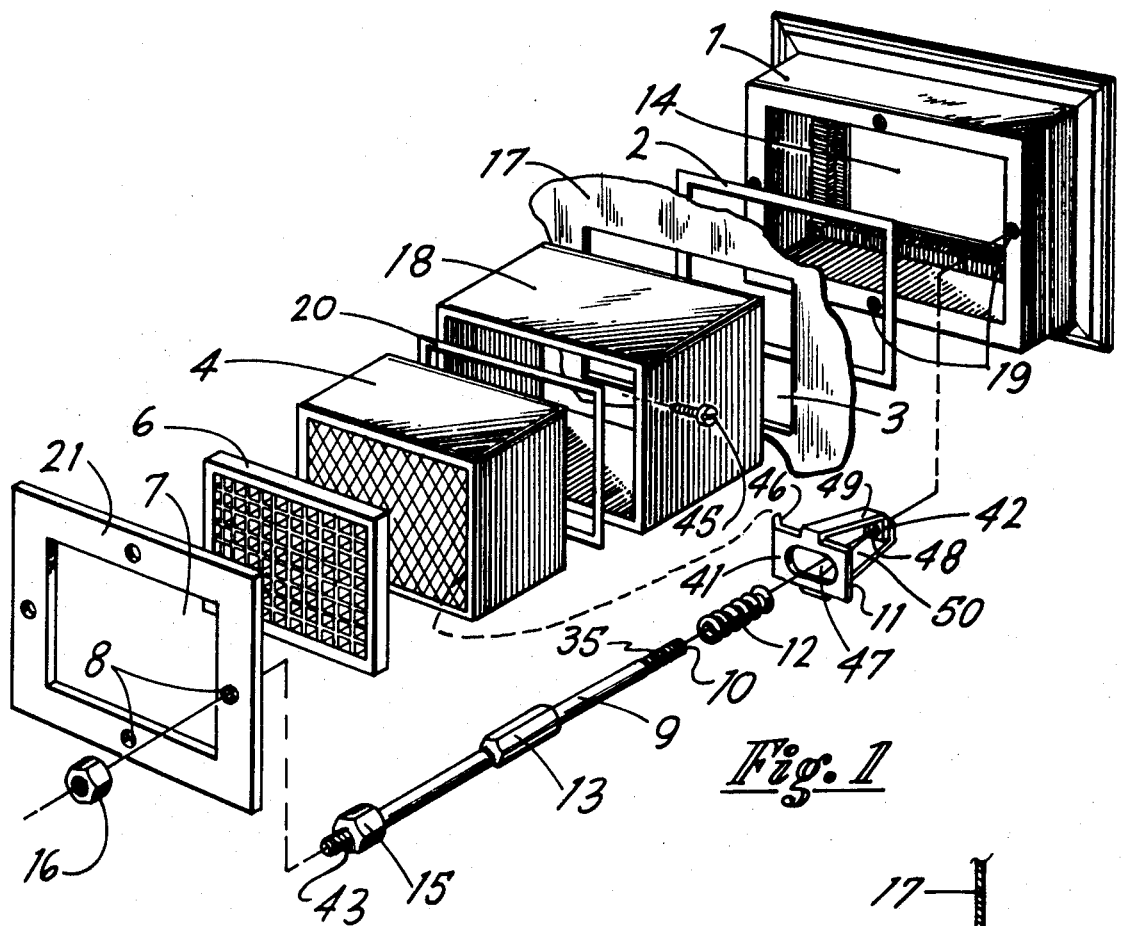
Fig. 1
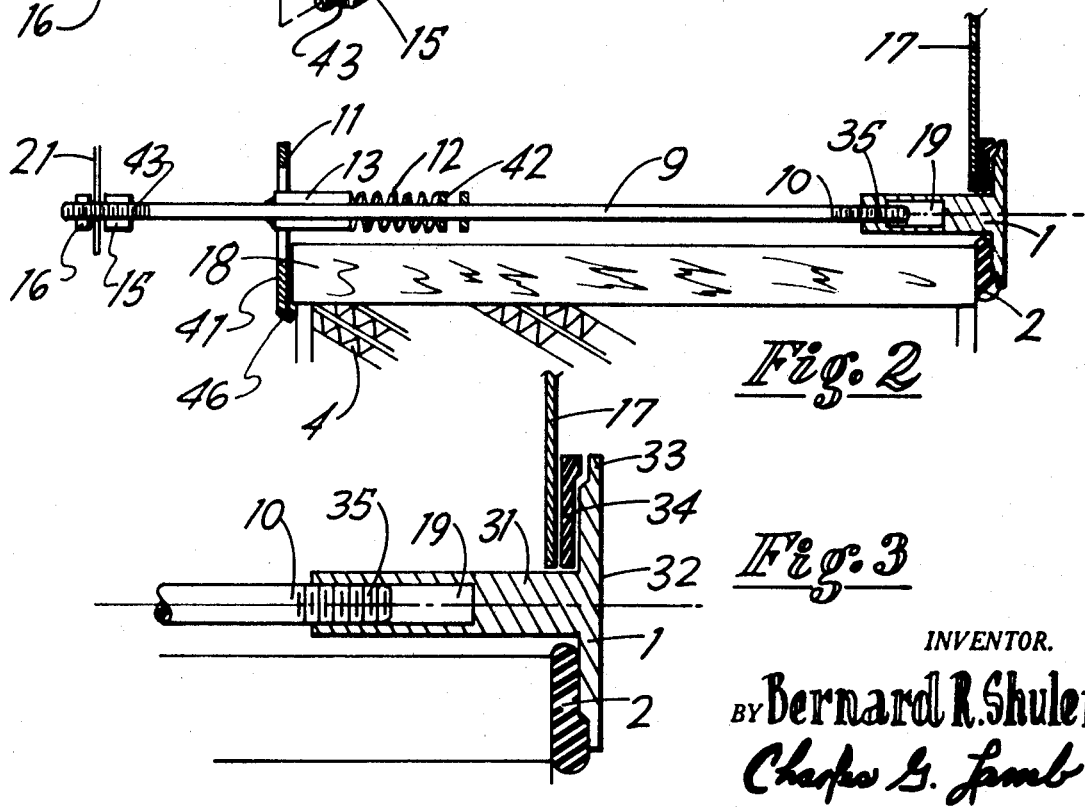
Fig. 2
Fig. 3
INVENTOR.
BY Bernard R. Shuler
Charles G. Lamb
ATTORNEY

AIR FILTERING UNIT INCLUDING A CLAMPING ASSEMBLY

BACKGROUND OF THE INVENTION

This invention relates to air filtering units and more particularly to an air filtering unit having a new, useful, and unobvious clamping assembly for supporting air filtering assemblies.

In recent years there has been considerable activity in the providing of rooms having a controlled environment. In some of these environments it has become desirable to provide rooms wherein the amount of particulate matter in the atmosphere is undetectable by any of the known particulate matter detecting devices. Considerable progress has been made but one of the problems still encountered is the controlling of particulate matter leakage at the juncture of an air filter with an opening in a plenum which is to be environmentally controlled. Many different clamping devices and sealing means have been tried but still problems arose. For example, in installing a filter in a flow-through support, the support being on the outside of a plenum but in communication with an opening in the wall of the plenum, means to compress the filter against the support with gasketing materials disposed therebetween has created problems. Firstly, whenever the filter has been clamped against the gasket, it has been in many cases uneven. This permits leakage around the gasket whereby particulate matter has entered the environmentally controlled plenum. Secondly, excessive tightening of the filter to the gasket material has caused wear and short life of the gasket whereby after a relatively short period of time cracks have developed in the seal and particulate matter has passed through the cracks and into the environmentally controlled plenum. The present invention recognizing these past problems, further recognizes that clamp means for engaging a filter in communication with a support wherein the seal between the filter and the support is such that particulate matter would not leak through nor around the seal is desired.

SUMMARY OF THE INVENTION

In the present invention, it is recognized that it is desirable to provide a means for compressing a filter to a support with a sealing gasket disposed therebetween wherein said sealing gasket is composed of a resilient rubber or the like. It is further recognized that it is desirable to provide an air filtering unit wherein the seal between a filter and its support provides for a minimum amount of leakage. Also, it is recognized that it is desirable to provide a protective grid for the filter in combination with an air filtering unit. Even further, it is recognized that in order to combine a protective grid means with an air filter unit, a clamping assembly which holds the filter in non-leaking communication with the support and in spaced alignment with the protective grid means is desirable.

The present invention advantageously provides a straightforward arrangement for the preparation of an air filtering unit.

The present invention further provides a means for clamping an air filtering assembly to an air passage.

Various other features of the present invention will become obvious to those skilled in the art upon reading the disclosure set forth hereinafter.

More particularly, the present invention provides an air filtering unit comprising: a first flow-through support member having clamp assembly receiving means; a filter assembly having opposed faces thereon; a resilient gas impervious sealing gasket, the gasket being adapted for communication between one of the faces of the filter assembly and the first support member; a second flow-through support member having apertures therein, the apertures being in spaced alignment with clamp assembly receiving means of the first support member; clamping assemblies extending along the filter assembly to fasten the support members and the filter assembly together, each clamping assembly including (1) a shaft member having a threaded portion on at least one end and a fixed flange portion at a selected position thereon, the threaded portion being adapted to be received by the clamp assembly receiving means of the first support member, (2) a clamp adapted to engage the filter assembly, the clamp being slidably mounted for limited movement on the shaft member, (3) compression means cooperating with the flange portion on the shaft member for moving the clamp toward the clamp assembly receiving means, the threaded portion of the shaft being engaged and adjusted in the clamp assembly receiving means, and (4) means for engagement with the second support, the means being adapted to be received by the opposite end of the threaded portion of the shaft member.

It is to be understood that the description of the examples of the present invention given hereinafter are not by way of limitation. Various modifications within the scope of the present invention will occur to those skilled in the art upon reading the disclosure set forth hereinafter.

Referring to the drawings:

FIG. 1 is an explosive perspective view of one air filtering unit of the present invention;

FIG. 2 is a cross-sectional view illustrating the clamping assembly of FIG. 1; and FIG. 3 is an enlarged cross-sectional view illustrating the clamp receiving means and sealing means of FIG. 2.

FIG. 1 illustrates one preferred embodiment of the present invention comprising support member 1 having a flow-through aperture 14 therein and a filter assembly. The filter assembly illustrated includes housing 18 adaptable for receiving flow-through filter 4 therein with sealing gasket 20 disposed therebetween. Housing 18 including flow-through filter 4 therein is adaptable for communicative relation with the support 1 with sealing gasket 2 being disposed therebetween. A hanger support member 21 is provided for supporting protective grid 6, the support member 21 being in spaced alignment with filter housing 18.

Four clamping assemblies 10, hereinafter described, are provided to extend along the side of and to hold the filter assembly in fluid tight communication with support member 1 and in spaced alignment with support member 21.

The support member 1 is an elongated rectangular-shaped member of T-shaped cross-section conventionally designed as a component of a suspended ceiling 17. Housing 18 including filter 4 and hanger support member 21 for the protective grid 6 are suspended from ceiling 17 by means of support member 1.

FIG. 3 illustrates that the support member 1 includes a stem 31 with flange 32 depending from one end of the stem 31 defining a channel having an inverted T-shaped cross section. Stem 31 is further provided with an internally threaded aperture 19 therein for receiving one end of the clamp assembly 10. Flange 32 has an inwardly extending ledge portion of a two thickness dimension designated as a thin lip 33 and a thick lip 34 adjacent said thin lip 33. Thin lip 33, extending toward the outside extremity of flange 32, is provided to allow proper seating of the sealing gasket 2 between the ceiling 17 and the thick lip 34.

Four clamping assemblies 10 can be provided, only one being described, each includes a threaded shaft member 9 having a first threaded portion 35, a second threaded portion 43, and a fixed flanged portion 13 at a selected position on the shaft, the first portion 35 being adapted to be received in screw engagement with internally threaded aperture 19 of support member 1. Clamping assembly 10 further includes a clamp 11, spring means 12, and nuts 15 and 16 whereby the flanged portion 13 is positioned on the shaft 9 for communication with spring means 12 for prevention of movement of spring means 12 along shaft 9 in the direction of second threaded portion 43. Shaft 9 is further adapted to receive a stirrup shaped clamp 11 with spring 12 being disposed along the shaft 9 between the flanged portion 13 and the head 42 of the stirrup shaped clamp 11. The second threaded end portion 43 is adapted to receive nuts 15 and 16 with support 21 disposed therebetween, nuts 15 and 16 holding support 21 in spaced alignment with the filter assembly. Support 21 is further provided with apertures 8 therein for receiving shaft member 9 therethrough.

Stirrup clamp 11 is provided with a base portion 41 including a lip 46 for engagement with the outer edge of filter 4, base portion 41 further including an oblong aperture 47 therein for receiving shaft 9 therethrough. Clamp 11 further includes a head portion 42 having an aperture 48 therein for receiving shaft 9 therethrough and a pair of legs 49 and 50 fixedly attached at their ends to portions 41 and 42 for maintaining the portions in spaced relationship therefrom. Aperture 47 has a minimum distance across the opening greater than the outer diameter of spring 12 wherein spring 12 mounted onto shaft 9 will pass through aperture 47. Aperture 48 has a diameter greater than shaft 9 but less than the outer diameter of spring 12 thereby preventing the movement of spring 12 therethrough. Aperture 47 illustrated as oblong shaped may be circular as well but it has been found that the oblong shape is preferred to allow for play in shaft 9 when inserting shaft 9 into threaded aperture 19.

In the assembly of an air filtering assembly of the present invention to a ceiling 17, an aperture 3 is provided in the ceiling 17 wherein one side of flange 32 of support member 1 of T-shaped cross-section is adapted to be received thereby with a sealing gasket 34 disposed therebetween (FIG. 3). A resilient sealing gasket material 2 is applied to the opposite side of flange 32 of T-shaped support member 1. Housing 18 is inserted into the aperture 3 and brought in contact with the support member 1, the resilient sealing gasket 2 being disposed therebetween. A soft, pliable gasket 20 is applied to the inner periphery of housing 18. Filter 4 is placed within housing 18 with the gasket 20 being disposed therebetween. Filter 4 is held securely therein by screws 45. Spring means 12 is then placed onto threaded shaft member 9 at the first threaded end 35. Clamp 11 is also placed on shaft member 9 at the first threaded end 35. Threaded shaft 9 is then screw engaged with threaded aperture 19 of T-shaped support member 1. Lip 46 of clamp 11 is then placed in engaging relationship with the edges of the filter 4 and the threaded shaft 9 is tightened into clamp receiving means 19 pulling filter assembly 4 tight against support 1. Movement of filter 4 in direction of support 1 is accomplished by the flanged portion 13 urging spring 12 toward clamp 11.

Nut 15 is screw engaged with the second threaded end portion 43 of shaft member 9 and support 21 is then added to shaft member 9 by passing the shaft member 9 through aperture 8. Nut 16 is then screwed onto the shaft member 9 to hold the support member 21 onto the shaft member 9. Protective grid 6, generally known as egg crate, is then inserted onto the support member 21 to protect the filter assembly 4.

In the aforementioned example, clamp assembly 10 includes a threaded shaft member 9 with a fixed flange portion 13 at a preselected position on the shaft. However, it is within the scope of this invention to include other clamp assemblies which may include other means including adjustable ones to hold spring means on the shaft and prevent slidable movement of the spring. Further, it is realized that a support member for the protective grid may be of unitary construction including the protective grid within the construction. Also, it is realized that the second support member may be used for supporting other accessories in an air filtering assembly instead of a protective grid, such as, an illuminaire, for example.

In one preferred method of installing the housing 18 including filter 4 into support 1, a spring having a predetermined deflection point is used. In this method, the bearing load transmitted by the clamp to the filter edge may be preselected and incorporated in the air filtering unit design. Thus, upon tightening the clamp assembly, the clamp assembly is self gauging upon reaching a preselected torque on the tightening means. In the use of two or more clamp assemblies in an air filtering unit, the preselected compression of the spring means assures even distribution of the load over the gasket and assures proper seating of the filter assembly.

Thus, it will be realized that various changes may be made to the specific embodiment shown and described without departing from the scope and spirit of the present invention.

What is claimed is:

1. An air filtering unit comprising:
   a. a first flow-through support member having clamping assembly receiving means spaced from the flow-through opening;
   b. a flow-through filter housing having opposed surfaces thereon;
   c. a resilient gas impervious sealing gasket, said gasket being disposed between one of said surfaces of said filter housing and said first support member;
   d. a second flow-through support member having apertures therein spaced from the flow-through opening thereof, said apertures being in spaced alignment with clamp assembly receiving means of said first support member; and,
   e. clamping assemblies extending along said filter housing fastening said support members and said filter housing together, each clamping assembly including (1) a shaft member having a threaded portion on at least one end and a fixed flange portion at a selected position thereon, said threaded portion being received by said clamping assembly receiving means of said first support member, (2) a clamp engaging said filter housing, said clamp being slidably mounted for limited movement on said shaft member, (3) compression spring means disposed between said flange portion on said shaft member and said clamp, said spring means being retained by said clamp, said threaded portion of said shaft being engaged and adjusted in said clamp assembly receiving means, and (4) means engaging with said second support, said engaging means receiving the opposite end of said threaded portion of said shaft member, said shaft member extending through said aperture of said second support member, and said engaging means fixedly positioning said second support member in relation to said filter housing.

2. The air filtering unit of claim 1, said first flow through support member having an inwardly extending ledge portion of a two thickness dimension providing a thin lip and a thick lip, said thin lip being adjacent said thick lip and extending toward the outer periphery of said inwardly extending ledge.

3. The air filtering unit of claim 1, said second support member being of unitary construction including protective grid means.

4. The air filtering unit of claim 1 including a protective grid in communication with said second support member.

5. The air filtering unit of claim 1, said first flow through support member being installed in a ceiling.

6. The air filtering unit of claim 1 wherein said clamp is a stirrup clamp comprising a base, a head, and a pair of legs fixedly attached to said head and said base, said head being in spaced relation with said base; said base including a lip engaging the edge of said filter assembly and having an aperture therein; said head having an aperture therein, said aperture being in axial alignment with said aperture in said base.

7. The air filtering unit of claim 6, said compression means being spring means whereby rotation of said shaft member urges said flange portion toward and away from said spring means.

8. The air filtering unit of claim 7, said aperture in said base being oblong in shape and receiving said spring means therethrough.

9. The air filtering unit of claim 7, said spring means having a preselected deflection point.

* * * * *